Patented Dec. 6, 1932

1,890,277

UNITED STATES PATENT OFFICE

WALTER BAUER, OF DARMSTADT, GERMANY, ASSIGNOR TO ROHM & HAAS AKTIENGE-SELLSCHAFT, OF DARMSTADT, GERMANY, A CORPORATION OF GERMANY

PROCESS OF PRODUCING ACRYLIC ACID ESTERS

No Drawing. Application filed January 15, 1931, Serial No. 509,034, and in Germany February 20, 1930.

My invention relates to the production of acrylic acid esters, and the invention more especially consists in a novel process producing acrylic acid esters.

I have discovered that by the action of dehydrating agents on the esters of hydracrylic acid at temperatures of about 200° C. a very good yield of acrylic acid esters can be obtained.

The result is the more unexpected since it is well known that the acrylic acid esters polymerize already at much lower temperatures. Polymerization also occurs in the process according to the present invention, but only in a negligible degree.

As dehydrating agent, one can use stoichiometrical or catalytic amounts of sulfuric acid, phosphoric acid etc. and also bodies having large surfaces. Moreover, other additions, especially salts and also metals have proved expedient.

Furthermore, I have found that likewise the derivatives of the esters of hydracrylic acid, such as the esters of alkoxy propionic acid, can be employed.

Example 1

100 parts of hydracrylic acid ethyl esters are conducted at a temperature of about 200° C. over silica gel which is soaked with concentrated sulfuric acid. There are formed about 60 parts of acrylic acid ethyl esters.

Example 2

100 parts of methoxy propionic acid methyl esters are passed at a temperature of about 200° C. in the form of a vapor into twenty (20) grammes of concentrated sulfuric acid, to which are added three (3) grammes of ammonium sulfate and 0.2 grammes of hydroquinone. 50 to 60 parts of acrylic acid methyl esters are obtained. The not transformed methoxy-propionic acid methyl ester is recovered.

I claim:

1. The process of producing alkyl esters of acrylic acid, comprising treating hydracrylic acid esters with a dehydrating agent as a catalyst at temperatures of about 200° C.

2. The process of producing alkyl esters of acrylic acid, comprising treating alkoxy propionic acid esters with a dehydrating agent as a catalyst at temperatures of about 200° C.

3. The process of producing alkyl esters of acrylic acid, comprising treating hydracrylic acid esters with a dehydrating agent in a stoichiometrical proportion at temperatures of about 200° C.

In testimony whereof I affix my signature.

WALTER BAUER.